United States Patent

[11] 3,587,468

[72] Inventor Billy R. Bliss
       Bedford, Ind.
[21] Appl. No. 742,972
[22] Filed July 2, 1968
[45] Patented June 28, 1971
[73] Assignee The United States of America as represented by the Secretary of the Navy

[54] PHOTOFLASH CARTRIDGE HAVING DUAL FLASHES
3 Claims, 4 Drawing Figs.

[52] U.S. Cl. ................................................ 102/32
[51] Int. Cl. ................................................ F42b 5/16
[50] Field of Search ................................ 102/32, 39, 87, 90

[56] References Cited
UNITED STATES PATENTS

| | | | |
|---|---|---|---|
| 1,754,987 | 4/1930 | Driggs, Jr. et al. | 102/32 |
| 1,947,834 | 2/1934 | Driggs, Jr. et al. | 102/32 |
| 3,431,852 | 3/1969 | Fowler | 102/32 |
| 3,473,472 | 10/1969 | Bliss et al. | 102/87X |

Primary Examiner—Robert F. Stahl
Attorneys—George J. Rubens, H. H. Losche and Paul S. Collignon ABSTRACT: A photoflash cartridge having first and second inner containers coupled together and slidably positioned within a cartridge case, said first inner container containing a key flash composition which is first ignited and utilized as a signal for opening a camera shutter and said second inner container having a charge of photoflash composition which is ignited after said key flash composition is ignited to provide illumination for night aerial photography.

PATENTED JUN 28 1971
3,587,468
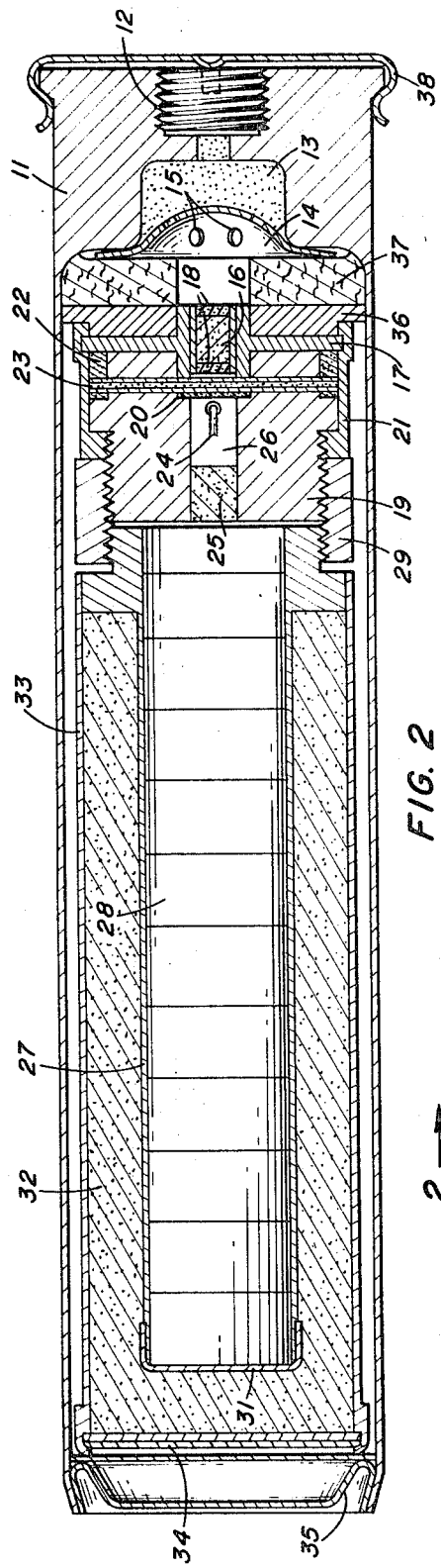
FIG. 2
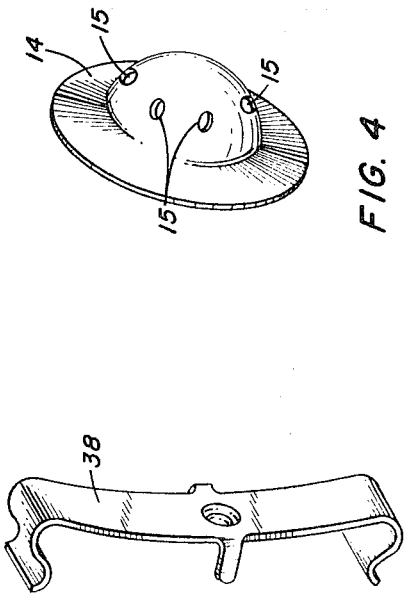
FIG. 4
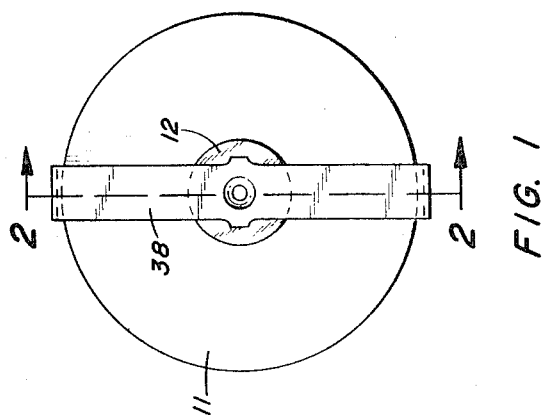
FIG. 3
FIG. 1
INVENTOR
BILLY R. BLISS
BY H. H. Losch
Paul S. Collignon
ATTORNEYS

PHOTOFLASH CARTRIDGE HAVING DUAL FLASHES

The invention described herein may be manufactured and used by or for the Government of the United States of America for governmental purposes without the payment of any royalties thereon or therefor.

CROSS-REFERENCES TO RELATED APPLICATIONS

Application of Billy R. Bliss, Clarence W. Gilliam, and John E. Laswell, entitled, PHOTOFLASH CARTRIDGE, Ser. No. 390,266, filed Aug. 13, 1964, which issued Oct. 21, 1969, as U.S. Pat. No. 3,473,472.

BACKGROUND OF THE INVENTION

The present invention relates to a photoflash cartridge for providing illumination in support of night aerial photography and more particularly to a photoflash cartridge having an auxiliary flash composition which ignites prior to a main flash to operate as a detectable signal for opening a camera shutter.

Prior to the invention disclosed in the above-mentioned application for a "Photoflash Cartridge," most photoflash devices provided high-intensity flash, however, the flash duration was relatively long which affected the quality of a picture being taken. In the invention disclosed in the referenced application, an explosive mixture is provided within the flash composition and upon ignition, the explosive mixture causes the surrounding flash composition to be rapidly ignited. The first 4.5 milliseconds of light energy is used only for opening a camera shutter and this period includes the peak intensity, thus losing this light energy for film exposure.

SUMMARY OF THE INVENTION

The present invention has first and second containers coupled together and slidably contained in a cartridge case. One container has a key flash composition and the second container carries the main flash composition. The cartridge case contains an electric primer and a propellant charge and, upon ignition of the primer, the propellant charge expels the first and second containers from the cartridge case and ignites an ejection delay fuze of 1-second duration. The ejection delay fuze allows the two containers to travel a safe distance from the aircraft before the key flash composition is ignited. The ejection-delay fuze ignites another fuze which transfers ignition to the key flash composition and, upon ignition, the key flash composition produces a low-intensity flash of short duration which is utilized to open a camera shutter. After the camera shutter is opened, the main flash composition is ignited to illuminate a target.

BRIEF DESCRIPTION OF THE DRAWING

FIG. 1 is an end view of a preferred embodiment of the present invention;

FIG. 2 is a sectional view taken on line 2–2 of FIG. 1;

FIG. 3 is a perspective view of a shunting clip; and

FIG. 4 is a perspective view of a primer shield.

DESCRIPTION OF THE PREFERRED EMBODIMENT

Referring now to the drawing which shows a preferred embodiment of the present invention, a cartridge case 11 is provided that is adaptable for fitting into a military-type ejector. Cartridge case 11 is substantially closed on one end which is provided with a threaded hole so that an electric primer 12 can be threadedly connected therein. The opposite end of cartridge case 11 is open. The closed end of cartridge case 11 is provided with a counterbore that is filled with an expelling charge 13, such as black powder. Expelling charge 13 is adjacent primer 12 and is retained in position by means of a primer shield 14. As shown in FIG. 4 of the drawing, primer shield 14 is provided with a plurality of small holes 15 that, upon ignition of the black powder, permits a flame to pass through the primer shield to ignite a delay composition 16 that is compressed into a delay holder 17.

By way of example, the delay composition might be comprised of about 82.2 percent, by weight, of barium chromate, about 7.8 percent, by weight, of boron, and about 10 percent, by weight, of diatomaceous earth (99 percent $SiO_2$). By filling a ¼-inch diameter bore with about a 1-inch length of the foregoing described delay composition, a delay of approximately 1 second is achieved. By increasing the percent of barium chromate and reducing the percent of boron, the delay period can be increased. An ignition mixture 18 is pressed on each end of delay composition 16 and, by way of example, ignition mixture 18 might be comprised of about 90 percent, by weight, of barium chromate and about 10 percent, by weight, of boron.

A key flash housing 19 is provided with a reduced-diameter portion and charge case 21 surrounds housing 19 to provide a cavity which contains a key flash composition 22. By way of example, key flash composition might be comprised, by weight, of 40 percent aluminum powder (average particle size about 16.3 microns), 30 percent potassium perchlorate (average particle size about 8.5 microns) and 30 percent granulated barium nitrate). A fuze 23 which, by way of example, might be of lead azide core material in a lead sheath, and manufactured by E. I. Du Pont de Nemours & Co., Inc., Wilmington, Delaware, under the trade name Pyrocore, is inserted in a hole in housing 19 to ignite key flash composition 22. Fuze 23 is ignited from the heat and flame from delay composition 16.

Another fuze 24 and a delay detonator 25 are provided in a bore 26 in housing 19. By way of example, fuze 24 might be similar to fuze 23 and delay detonator 25 might consist of a delay composition, such as a 90 percent barium chromate and a 10 percent boron composition, which is pressed on an explosive material. Fuze 24 is ignited from the heat and flame of key flash composition 22 and, in order to facilitate ignition, a transfer ignition composition 20 is provided and, by way of example, might be A1A composition, (By weight, 65 percent zironcium powder, 25 percent Iron oxide, Ferric ($Fe_2O_3$) and 10 percent diatomaceous earth), as defined in Military Specification MIL-P-22264. The A1A composition 20 can be attached to the forward end of housing 19 by making a slurry comprised, by weight, of four parts A1A composition and one part of nitrocellulose camphor acetone solution.

A pellet tube 27, containing a plurality of explosive pellets 28, is provided with a threaded end, and coupling 29 threadedly connects pellet tube 27 and housing 19 together. By way of example, explosive pellets 28 might be RDX Composition CH-6, which is described in Military Specification MIL-R-21723. RDX Composition CH-6 is a homogeneous explosive mixture of about 97.5 percent RDX (Type B, Class A, as outlined in MIL—398C), about 1.5 percent calcium stearate, about 0.5 percent graphite, and about 0.5 percent polyisobutylene. A pellet tube cap 31 is provided to close the outer end of pellet tube 27.

A photoflash composition 32 is contained within charge case 33 and, by way of example, might be comprised of about 60 percent potassium perchlorate and about 40 percent atomized aluminum powder. A closing disc 34 is provided to close the end of charge case 33 which is then crimped or spun-over at its outer end, and likewise, cap 35 is provided to close the outer end of cartridge case 11. Gas checks 36 and 37 are provided in the forward end of cartridge case 11. A shunting clip 38 is removable attached to cartridge case 11 and engages and shorts primer 12 to prevent accidental ignition of primer 12.

OPERATION

In operation, shunting clip 38 is retained in the position shown in FIGS. 1 and 2 of the drawing until just prior to placing cartridge case 11 in an ejector, at which time clip 38 is removed. Upon the application of an electric current to primer 12, primer 12 will ignite and, in turn, ignite expelling charge 13 which will expel charge cases 21 and 33 out of the outer end of cartridge case 11. Expelling charge 13 ignites ejection delay composition 16 which, in turn ignites key flash composition 22 through fuze 23. The ejection-delay composition 16 allows charge cases 21 and 33, which are coupled together, to travel a safe distance from the aircraft from which launch takes place before ignition of key flash composition 22. Ignition of key flash composition 22 causes case 21 to burst, and a low-intensity flash of a few milliseconds duration is produced. This low-intensity flash is observed by a flash detector in the camera system and initiates mechanical action to open a camera shutter.

The heat and flame produced by key flash composition 22 ignites, in order, transfer ignition composition 20 and fuze 24. Fuze 24, in turn, ignites delay detonator 25 which causes explosive pellets 28 to be detonated. Delay detonator 25 functions to delay the detonation of explosive pellets 28 until the camera shutter is fully open. The explosion of pellets 28 detonates photoflash composition 32 to provide a high-intensity flash of short duration.

It can thus be seen that the present invention provides an improved photoflash cartridge which provides a first flash which can be utilized for opening a camera shutter and a second flash of high intensity and short duration.

Obviously many modifications and variations of the present invention are possible in the light of the above teachings. It is therefore to be understood, that within the scope of the appended claims, the invention may be practiced otherwise than as specifically described.

I claim:

1. A photoflash cartridge comprising:
a cartridge case having a closed end and an open end,
an expelling powder charge within said cartridge case adjacent said closed end,
a first container of photoflash composition within said cartridge case,
first fuze means including a delay element for igniting the photoflash composition in said first container from the heat and flame produced by the combustion of said expelling powder,
a second container of photoflash composition within said cartridge case, said second container being coupled to said first container, and
second fuze means including a delay element for igniting the photoflash composition in said second container from the heat and flame produced by the combustion of said photoflash composition in said first container.

2. A photoflash cartridge as set forth in claim 1 wherein an electric primer is threadedly attached in said closed end of said cartridge case.

3. A photoflash cartridge as set forth in claim 1 wherein said photoflash composition in said first container is comprised of about 40 percent atomized aluminum powder, about 30 percent potassium perchlorate, and about 30 percent barium nitrate, and wherein said photoflash composition in said second container is comprised of about 60 percent potassium perchlorate and about 40 percent atomized aluminum powder.